United States Patent
Fei et al.

(10) Patent No.: US 9,714,710 B2
(45) Date of Patent: *Jul. 25, 2017

(54) ENERGY SAVING SELF-CONTACT SEAL WITH PUSHING BEAD

(71) Applicant: Freudenberg-NOK General Partnership, Plymouth, MI (US)

(72) Inventors: Neoh Kah Fei, Ipoh (MY); Muhammad Mujahid Azni, Kuala Lumpur (MY); Alexander Berdichevsky, Farmington Hills, MI (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/172,409

(22) Filed: Feb. 4, 2014

(65) Prior Publication Data

US 2015/0219219 A1    Aug. 6, 2015

(51) Int. Cl.
| F16J 15/32 | (2016.01) |
| F16J 15/322 | (2016.01) |
| F16J 15/16 | (2006.01) |
| F16J 15/3224 | (2016.01) |
| F16J 15/3232 | (2016.01) |
| F16J 15/3244 | (2016.01) |

(52) U.S. Cl.
CPC ........... *F16J 15/322* (2013.01); *F16J 15/164* (2013.01); *F16J 15/3224* (2013.01); *F16J 15/3232* (2013.01); *F16J 15/3244* (2013.01)

(58) Field of Classification Search
CPC .................................................. F16J 15/3224
See application file for complete search history.

(56) References Cited

U.S. PATENT DOCUMENTS

| 2,482,029 A | 9/1949 | Reynolds |
| 2,635,907 A | 4/1953 | Heimbuch |
| 2,697,623 A | 12/1954 | Mosher |
| 2,731,284 A | 1/1956 | Chambers, Jr. et al. |
| 2,736,583 A | 2/1956 | Marvin |
| 2,736,585 A | 2/1956 | Riesing |
| 2,736,586 A | 2/1956 | Riesing |
| 2,743,950 A | 5/1956 | Helfrecht et al. |
| 2,758,853 A | 8/1956 | Beck |
| 2,797,944 A | 7/1957 | Riesing |
| 3,005,648 A | 10/1961 | Christensen |

(Continued)

*Primary Examiner* — Vishal Patel
(74) *Attorney, Agent, or Firm* — Daniel J. Sepanik, Esq.; Harness, Dickey & Pierce, P.L.C.

(57) ABSTRACT

An energy saving seal seals between a bore and a shaft for separating an oil side from an air side of the seal. The seal includes an annular mounting portion having a bellows portion extending axially and radially inward from the mounting portion. An axial leg extends axially from the bellows portion toward the air side. A lay down sealing lip extends radially inward and axially toward the oil side from an end of the axial leg. The sealing lip includes a bead on an outer surface. A dust lip extends from the end of the axial leg in a direction opposite the lay down sealing lip. When the oil side is under a negative pressure, the axial leg flexes inward in response to the negative pressure and engages the bead to provide a self-contact feature that holds the lay down sealing lip in engagement with the shaft.

8 Claims, 3 Drawing Sheets

(56) References Cited

U.S. PATENT DOCUMENTS

| | | |
|---|---|---|
| 3,049,356 A | 8/1962 | Talamonti |
| 3,356,376 A | 12/1967 | Bradfute et al. |
| 3,477,730 A | 11/1969 | Kare et al. |
| 3,554,566 A | 1/1971 | Bechtrold et al. |
| 3,572,734 A | 3/1971 | Holt |
| 3,612,546 A | 10/1971 | Otto et al. |
| 3,623,738 A | 11/1971 | MacDonnell |
| 3,785,660 A | 1/1974 | Bush |
| 3,822,890 A | 7/1974 | Bourgeois |
| 3,827,703 A | 8/1974 | Brink |
| 3,921,987 A | 11/1975 | Johnston |
| 3,921,990 A | 11/1975 | Johnston |
| 3,941,396 A | 3/1976 | Bailey et al. |
| 4,021,049 A | 5/1977 | Phelps et al. |
| 4,037,849 A | 7/1977 | Thumm |
| 4,102,538 A | 7/1978 | Bertin |
| 4,106,781 A | 8/1978 | Benjamin et al. |
| 4,126,320 A | 11/1978 | Pendleton |
| 4,132,421 A | 1/1979 | Corsi et al. |
| 4,190,258 A | 2/1980 | Arai et al. |
| 4,208,060 A | 6/1980 | St. Laurent, Jr. |
| 4,226,428 A | 10/1980 | Paptzun |
| 4,229,010 A | 10/1980 | St. Laurent, Jr. |
| 4,243,235 A * | 1/1981 | Repella .............. B29D 99/0053 264/159 |
| 4,270,762 A | 6/1981 | Johnston |
| 4,274,641 A * | 6/1981 | Cather, Jr. ............ F16J 15/322 277/309 |
| 4,298,206 A * | 11/1981 | Kojima ................ F16L 17/035 277/626 |
| 4,300,778 A | 11/1981 | Gagne |
| 4,344,631 A | 8/1982 | Winn |
| 4,348,031 A | 9/1982 | Johnston |
| 4,360,208 A * | 11/1982 | Hill ...................... F16J 15/3284 277/504 |
| 4,413,829 A | 11/1983 | Pietsch |
| 4,449,717 A | 5/1984 | Kitawaki et al. |
| 4,474,484 A | 10/1984 | MacInnes et al. |
| 4,519,616 A | 5/1985 | Johnston |
| 4,531,747 A | 7/1985 | Miura et al. |
| 4,531,748 A | 7/1985 | Jackowski |
| 4,550,920 A | 11/1985 | Matsushima |
| 4,553,763 A | 11/1985 | Ehrmann |
| 4,585,236 A | 4/1986 | Simmons et al. |
| 4,588,195 A | 5/1986 | Antonini et al. |
| 4,611,931 A | 9/1986 | Brandenstein et al. |
| 4,630,834 A | 12/1986 | Muller et al. |
| 4,635,947 A | 1/1987 | Hatayama |
| 4,643,436 A | 2/1987 | Jackowski |
| 4,650,196 A | 3/1987 | Bucher et al. |
| 4,750,748 A | 6/1988 | Visser |
| 4,805,919 A | 2/1989 | Wiblyi et al. |
| 4,815,749 A | 3/1989 | Johnston |
| 4,844,484 A | 7/1989 | Antonini et al. |
| 4,940,248 A | 7/1990 | Kilthau et al. |
| 4,986,553 A | 1/1991 | Preston et al. |
| 4,995,621 A | 2/1991 | Devouassoux et al. |
| 5,004,248 A | 4/1991 | Messenger et al. |
| 5,085,444 A | 2/1992 | Murakami et al. |
| 5,137,285 A | 8/1992 | Pick |
| 5,139,275 A * | 8/1992 | Ehrmann .............. F16J 15/3244 277/559 |
| 5,167,419 A | 12/1992 | Robertson |
| 5,183,269 A | 2/1993 | Black et al. |
| 5,190,299 A | 3/1993 | Johnston |
| 5,201,528 A | 4/1993 | Upper |
| 5,244,215 A | 9/1993 | Cather, Jr. et al. |
| 5,292,199 A | 3/1994 | Hosbach et al. |
| 5,348,312 A | 9/1994 | Johnston |
| 5,348,313 A | 9/1994 | Pawlakowitsch et al. |
| 5,370,404 A | 12/1994 | Klein et al. |
| 5,398,942 A | 3/1995 | Duckwall et al. |
| 5,427,387 A | 6/1995 | Johnston |
| 5,462,287 A | 10/1995 | Hering et al. |
| 5,462,288 A | 10/1995 | Hering et al. |
| 5,476,270 A | 12/1995 | vom Schwemm et al. |
| 5,501,469 A | 3/1996 | Ducugnon et al. |
| 5,509,667 A | 4/1996 | Klein et al. |
| 5,556,112 A | 9/1996 | Brandt |
| 5,624,290 A | 4/1997 | Von Bergen et al. |
| 5,668,426 A | 9/1997 | Lamert et al. |
| 5,692,757 A | 12/1997 | Straub |
| 5,711,534 A | 1/1998 | Bengoa et al. |
| 5,791,658 A | 8/1998 | Johnston |
| 5,842,828 A | 12/1998 | Ozawa et al. |
| 5,909,880 A | 6/1999 | Waskiewicz |
| 5,921,555 A | 7/1999 | Johnston |
| 5,957,461 A | 9/1999 | Ulrich |
| 5,967,527 A | 10/1999 | Fabro et al. |
| 6,019,229 A | 2/2000 | Rao |
| 6,139,023 A * | 10/2000 | Heine ............... B29C 45/14311 277/551 |
| 6,164,660 A * | 12/2000 | Goodman ............ F16J 15/3228 277/309 |
| 6,279,914 B1 | 8/2001 | Yamanaka et al. |
| 6,298,955 B1 | 10/2001 | Frost |
| 6,336,638 B1 | 1/2002 | Guth et al. |
| 6,357,757 B1 | 3/2002 | Hibbler et al. |
| 6,409,177 B1 | 6/2002 | Johnston |
| 6,428,013 B1 | 8/2002 | Johnston et al. |
| 6,481,896 B1 | 11/2002 | Ohtsuki et al. |
| 6,513,810 B1 | 2/2003 | Pataille |
| 6,513,812 B1 | 2/2003 | Yang et al. |
| 6,520,507 B2 | 2/2003 | Pataille et al. |
| 6,601,855 B1 | 8/2003 | Clark |
| 6,688,603 B2 | 2/2004 | vom Schemm |
| 6,702,293 B2 | 3/2004 | Endo et al. |
| 6,860,486 B2 | 3/2005 | Hacker et al. |
| 6,921,080 B2 | 7/2005 | Johnen |
| 6,921,082 B2 | 7/2005 | Lutaud |
| 6,945,537 B2 | 9/2005 | Guillerme et al. |
| 7,004,471 B2 | 2/2006 | Bryde et al. |
| 7,134,669 B2 | 11/2006 | Uhrner |
| 7,172,201 B2 | 2/2007 | Uhrner |
| 7,344,140 B2 | 3/2008 | Ikeda |
| 7,513,690 B2 | 4/2009 | Yamamoto et al. |
| 7,770,897 B2 | 8/2010 | Berdichevsky |
| 7,854,432 B2 | 12/2010 | Berdichevsky |
| 7,854,433 B2 | 12/2010 | Berdichevsky |
| 8,011,673 B2 | 9/2011 | Berdichevsky |
| 8,066,287 B2 | 11/2011 | Berdichevsky |
| 2002/0117810 A1 | 8/2002 | Schemm |
| 2002/0158421 A1 | 10/2002 | Johnston |
| 2003/0006563 A1 | 1/2003 | Cater et al. |
| 2003/0085527 A1 | 5/2003 | Hacker et al. |
| 2003/0189293 A1 | 10/2003 | Johnen |
| 2003/0230850 A1 | 12/2003 | Bruyere et al. |
| 2003/0230852 A1 | 12/2003 | Bengoa et al. |
| 2003/0230855 A1 | 12/2003 | Malone et al. |
| 2004/0160014 A1 | 8/2004 | Uhrner |
| 2005/0098959 A1 | 5/2005 | Uhrner |
| 2005/0104302 A1 | 5/2005 | Matsui et al. |
| 2005/0140097 A1 | 6/2005 | Kosty et al. |
| 2005/0167928 A1 | 8/2005 | Park et al. |
| 2006/0022414 A1 | 2/2006 | Balsells |
| 2006/0033291 A1 | 2/2006 | Tones et al. |
| 2006/0125192 A1 | 6/2006 | Johnston |
| 2006/0290070 A1 | 12/2006 | Park |
| 2007/0057472 A1* | 3/2007 | Hatch ............... B29C 45/14614 277/569 |
| 2008/0029970 A1* | 2/2008 | Krausz ................ F16L 17/035 277/549 |
| 2008/0143055 A1* | 6/2008 | Dobbs ................ F16J 15/3224 277/595 |
| 2008/0217865 A1* | 9/2008 | Sedlar ................ F16J 15/3224 277/572 |
| 2010/0244390 A1* | 9/2010 | Berdichevsky ........ F16J 15/322 277/568 |
| 2011/0241296 A1* | 10/2011 | Ting .................... F16J 15/3224 277/568 |

* cited by examiner

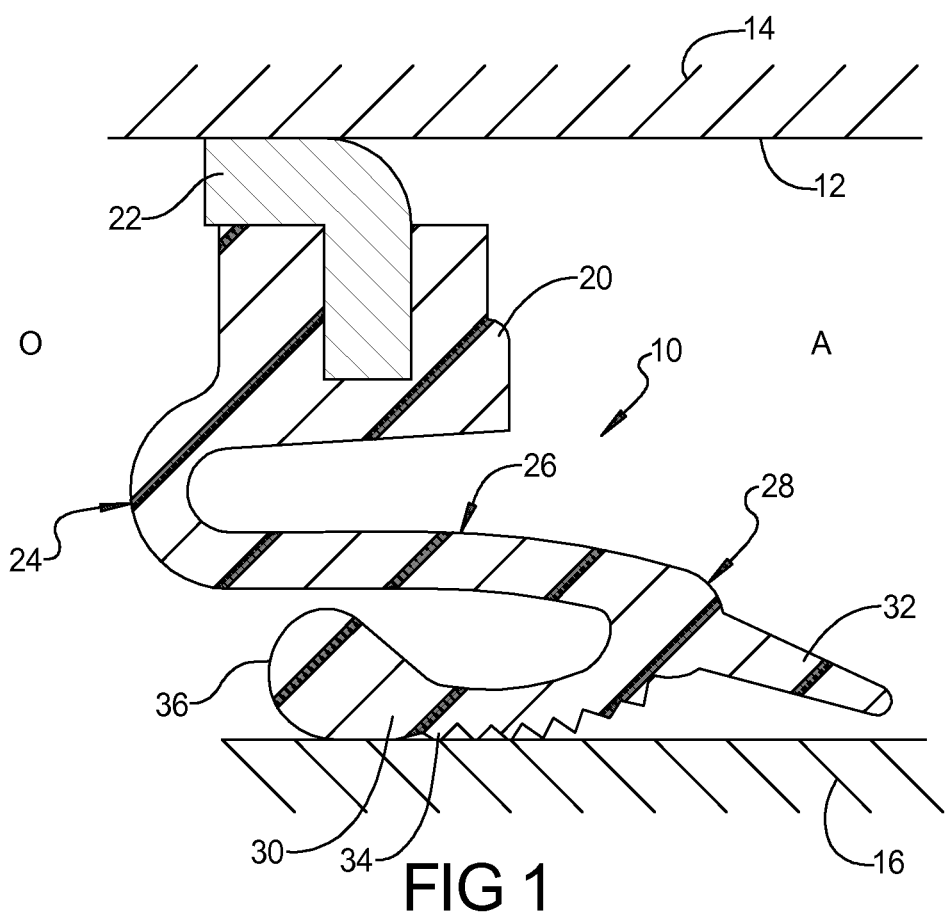
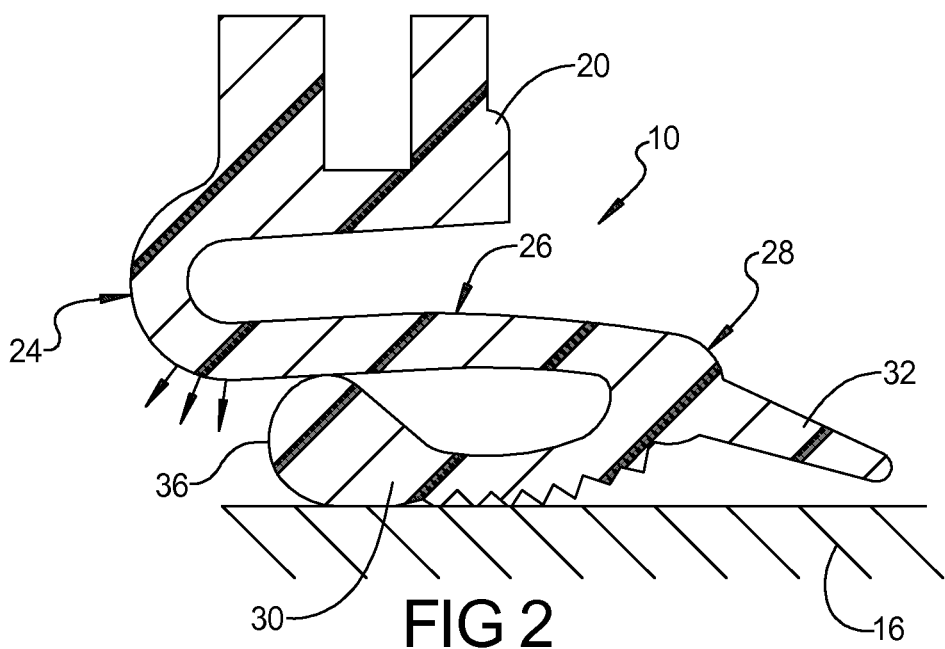

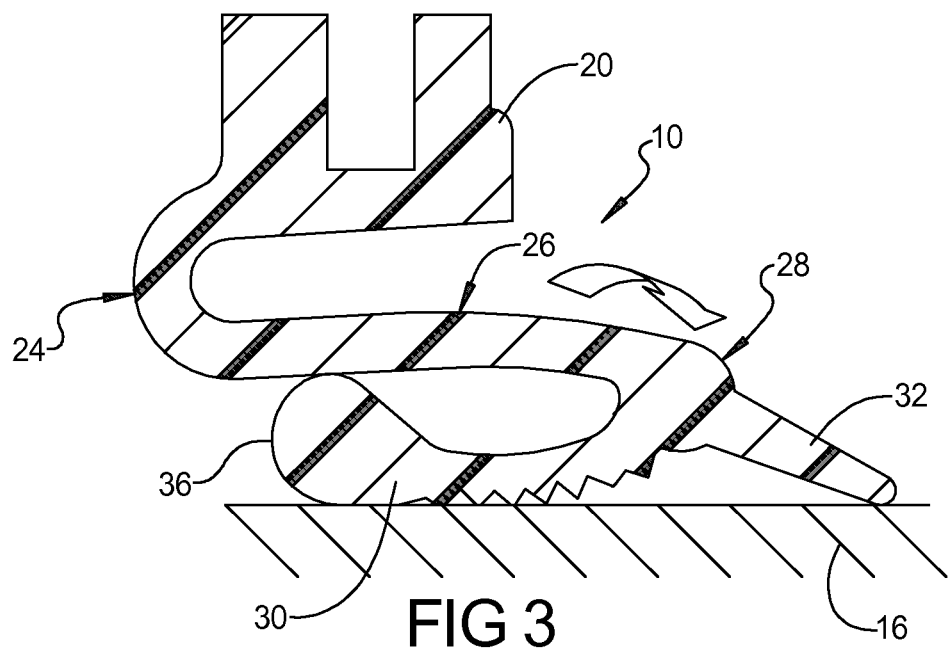
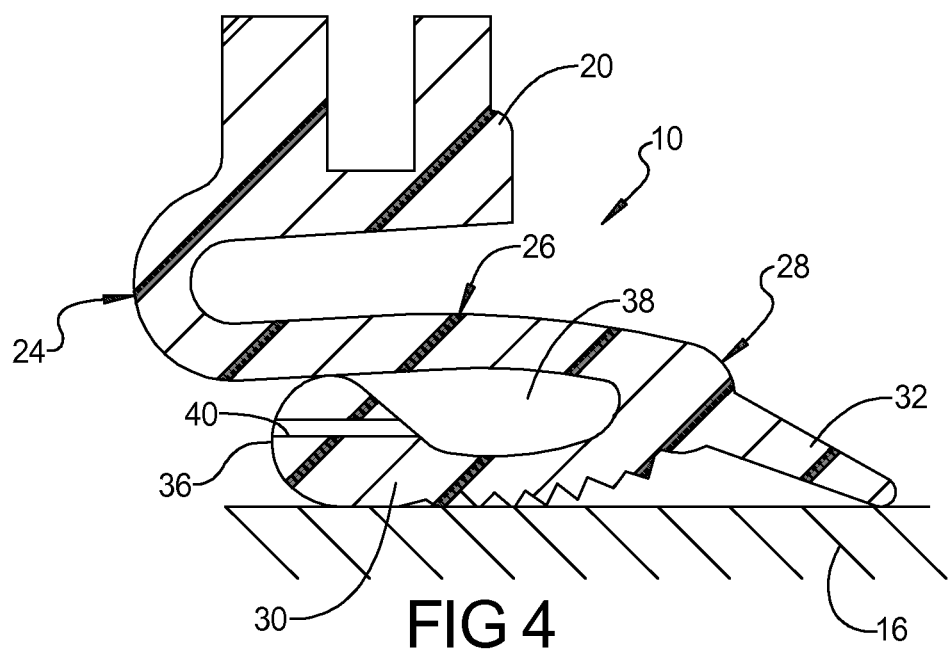

ENERGY SAVING SELF-CONTACT SEAL WITH PUSHING BEAD

FIELD

The present disclosure relates to a dynamic shaft seal and more particularly to an energy-saving self-contact seal with pushing bead.

BACKGROUND

This section provides background information related to the present disclosure which is not necessarily prior art.

Currently, lay down lip seals offering low power consumption due to low friction are recommended for use in engines with relatively low levels of crankcase pressure. The seal's radial force is sufficient to keep the lip in contact with a shaft for desired sealing performance yet is low enough to cause minimum friction. However, in certain forced induction engines such as turbocharged and supercharged engines, the crankcase pressure becomes negative and exceeds the capacity of the lay down lip seal to remain in contact with the shaft. This leads to the generation of an air flow from the environment to the crankcase. Interaction of this air flow with the sealing lip, oil and the shaft produces noise/squeal which is unacceptable to customers. Accordingly, it is desirable to provide a low friction seal that maintains seal contact in response to negative pressures on the oil side of the seal.

SUMMARY

This section provides a general summary of the disclosure, and is not a comprehensive disclosure of its full scope or all of its features.

The present disclosure is directed to a seal for sealing between a bore and a shaft for separating an oil side from an air side of the seal. The seal includes an annular mounting portion having a bellows portion extending axially and radially inward from the mounting portion. An axial leg extends axially from the bellows portion toward the air side. A lay down sealing lip extends radially inward and axially toward the oil side from an end of the axial leg. The lay down sealing lip includes a bead on an outer surface thereof. A dust lip extends from the end of the axial leg in a direction opposite the lay down sealing lip. When the oil side is under a negative pressure, the axial leg flexes inward in response to the negative pressure and engages the bead to provide a self-contact feature that holds the lay down sealing lip in engagement with the shaft. Furthermore, when the system is not under negative pressure, the dust lip is normally radially spaced from the shaft and when the oil side is under negative pressure, the end of the axial leg flexes to engage the dust lip with the shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a cross-sectional view of the energy-saving self-contact seal shown in a normal operating condition according to the principles of the present disclosure;

FIG. 2 is a cross-sectional view of the energy-saving self-contact seal of FIG. 1 shown under negative pressure from the oil side;

FIG. 3 is a cross-sectional view of the energy-saving self-contact seal shown after material relaxation wherein the dust lip is rocked about the axial leg to engage with the shaft under negative pressure from the oil side;

FIG. 4 is a cross-sectional view of an alternative energy-saving self-contact seal having an axial venting channel through the bead to allow the vacuum pressure to enter into an inner cavity formed when the axial leg contacts the bead.

Corresponding reference numerals indicate corresponding parts throughout the several views of the drawings.

DETAILED DESCRIPTION

Figure 5:
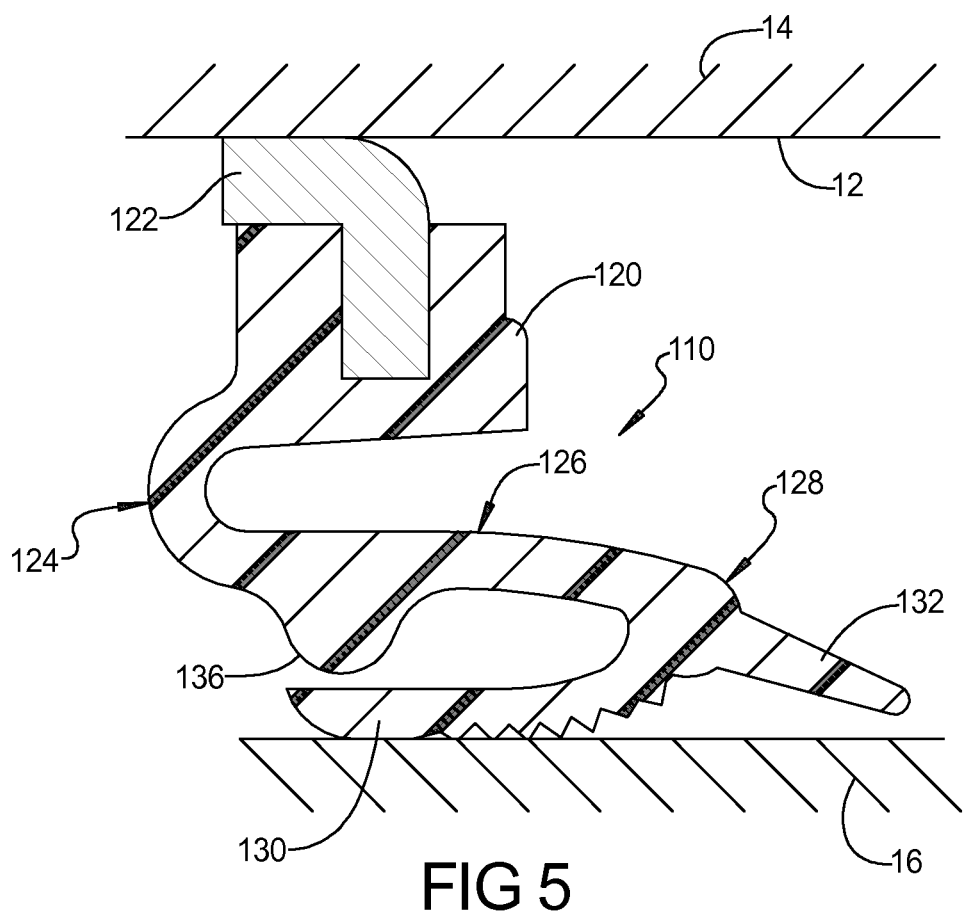
FIG. 5 is a cross-sectional view of an alternative energy-saving self-contact seal according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the energy saving self-contact seal 10 according to the principles of the present disclosure will now be described. The seal 10 is designed for sealing between a bore 12 in an outer member 14 and a shaft 16 and for separating an oil side "O" from an air side "A", as illustrated in FIG. 1. The seal 10 includes an annular mounting portion 20 that can be attached to a metal insert 22 or otherwise engaged with the bore 12 of the outer member 14. The annular mounting portion 20 and optional metal insert 22 can each take on many forms and the exemplary mounting portion 20 and a metal insert 22 as shown, are merely shown for illustrative purposes.

A bellows portion 24 extends axially and radially inward from the mounting portion 22. The bellows portion 24 extends axially and radially so that the bellows portion 24 can flex radially inwardly. An axial leg portion 26 extends axially from the bellows portion 24 toward the air side A. The axial leg 26 terminates at an end/pivot portion 28 from which a lay down sealing lip 30 extends radially inward and axially toward the oil side O. An optional dust lip 32 can extend radially inward and axially from the pivot portion 28 in a direction opposite the lay down sealing lip 30 toward the air side A. The pivot portion 28 may define a region of increased thickness relative to the axial leg portion 26, the lay down sealing lip 30 and the dust lip 32 to define a region that pivots relative to the axial leg portion 26 rather than being easily deformed.

The lay down sealing lip 30 can include pumping grooves 34 on an inner surface thereof. The lay down sealing lip 30 also includes a bead portion 36 on an outer surface thereof that extends outward toward the axial leg portion 26. Under operating conditions with little or no negative pressure on the oil side, the lay down sealing lip 30 engages the shaft 16 while the dust lip 32 is spaced from the shaft 16, as shown in FIG. 1. The lay down sealing lip 30 is engaged with and provides little friction against the shaft 16.

Under operating conditions with negative pressure on the oil side O, the axial leg 26 flexes inward in response to the negative pressure as illustrated by the arrows shown in FIG. 2. The negative pressure also tends to lift upward on the lay down sealing lip 30 (away from the shaft 16). However the axial leg 26 provides a self-contact against the bead 36 to hold the lay down sealing lip 30 in engagement with the shaft 16. The self-contact is also designed such that the bead 36 holds the axial leg upwards and maintains the dust lip 32 away from the shaft 16. This is done in order to keep a small gap between the dust lip 32 and shaft 16 so that the seal 10 maintains low frictional contact with the shaft 16.

As illustrated in FIG. 4, under installation conditions such as high shaft misalignment with the bore, the self-contact between the bead 36 and the axial leg portion 26 is no longer continuous circumferentially around the seal 10. Then, a gap can exist between the axial leg 26 and the bead 36 which allows a vacuum condition to exist within the inner cavity 38. This causes the axial leg 26 and lay down sealing lip 30 to flex and restore the complete self-contact which leads to the lay down sealing lip 32 properly sealing against the shaft 16. In order to improve the robustness of the vacuum propagation into the inner cavity 38, an axial venting channel 40 can be provided through the bead 36 connecting the oil side O to the inner cavity 38 and providing pressure balancing between the two regions.

After a significant service time, the seal may undergo significant material relaxation which will cause the self-contact between the axial leg 26 and the bead 36 to sever along a larger portion of the circumference. The flexing of the lay down sealing lip 30 and the axial leg 26 may not be sufficient to induce self-contact. However, the design can optionally be arranged to allow the whole seal to rock about the pivot portion 28, as illustrated by the arrow in FIG. 3, when vacuum is applied, bringing the dust lip 32 into contact with the shaft 16 and to prevent airflow from developing past the seal 10. As the axial leg 26 is able to flex inward, the vacuum also allows the bead 36 to once again meet with the axial leg 26. Keeping the dust lip 32 close to the shaft 16 helps in bringing the dust lip 32 in contact with the shaft with ease after material relaxation has developed.

Although the bead 36 is shown on the end of the lay down sealing lip 30, the location of the self-contacting bead 36 can be varied along the lay down sealing lip 30 and chosen to optimize the seal contact pressure with the shaft 16 and tailor it to the specific pumping feature of the grooves 34 formed on the contact surface of the lay down sealing lip 30. These features may include providing the pumping grooves 34 with either an edge static damn with booster zone or a mid-band located feature or other possible pumping features. The pumping grooves 34 are designed to maintain lubrication in the contact surface between the lay down sealing lip 30 and the shaft 16.

The seal material composition can include plastic, rubber, or any of a wide variety of known elastomers, such as PTFE, and TPE (thermoplastic elastomers) and TPV (thermoplastic volcanizates).

With reference to FIG. 5, an alternative energy saving self-contact seal 110 is shown including an annular mounting portion 120 that can be attached to a metal insert 122 or otherwise engaged with the bore 12 of the outer member 14. The annular mounting portion 120 and optional metal insert 122 can each take on many forms and the exemplary mounting portion 120 and a metal insert 122 as shown, are merely shown for illustrative purposes.

A bellows portion 124 extends axially and radially inward from the mounting portion 122. The bellows portion 124 extends axially and radially so that the bellows portion 124 can flex radially inwardly. An axial leg portion 126 extends axially from the bellows portion 124 toward the air side A. The axial leg 126 terminates at an end/pivot portion 128 from which a lay down sealing lip 130 extends radially inward and axially toward the oil side O. An optional dust lip 132 can extend radially inward and axially from the pivot portion 128 in a direction opposite the lay down sealing lip 130 toward the air side A. The pivot portion 128 may define a region of increased thickness relative to the axial leg portion 126, the lay down sealing lip 130 and the dust lip 132 to define a region that pivots relative to the axial leg portion 126 rather than being easily deformed.

The lay down sealing lip 130 can include pumping grooves 134 on an inner surface thereof. The axial leg portion 126 also includes a bead portion 136 on an inner surface thereof that extends inward toward the lay down sealing lip 130. Under operating conditions with little or no negative pressure on the oil side, the lay down sealing lip 130 engages the shaft 16 while the dust lip 132 is spaced from the shaft 16, as shown in FIG. 1. The lay down sealing lip 130 is engaged with and provides little friction against the shaft 16.

Under operating conditions with negative pressure on the oil side O, the axial leg 126 flexes inward in response to the negative pressure as illustrated by the arrows shown in FIG. 2. The negative pressure also tends to lift upward on the lay down sealing lip 130 (away from the shaft 16). However the bead 136 of the axial leg 126 provides a self-contact against the lay down sealing lip 30 to hold the lay down dealing lip 130 in engagement with the shaft 16. The self-contact is also designed such that the bead 136 holds the axial leg upwards and maintains the dust lip 132 away from the shaft 16. This is done in order to keep a small gap between the dust lip 132 and shaft 16 so that the seal 110 maintains low frictional contact with the shaft 16. As shown in FIG. 4, the bead 136 can include an axial venting channel therethrough.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal for sealing between a bore and a shaft for separating an oil side from an air side of the seal, comprising:
    a mounting portion;
    a bellows having a first portion extending axially from the mounting portion toward the oil side and radially inward from the mounting portion and a second portion extending radially inward from the first portion and axially toward the air side;
    an axial leg extending axially from the bellows in a second direction opposite to the first direction toward the air side, the axial leg extending from the second portion at a location on a first axial side of the mounting portion, a terminal end of the axial leg is connected to a pivot portion defined by a region of increased thickness relative to a thickness of the axial leg, the pivot portion being disposed at a location on a second axial side of the mounting portion opposite from the first axial side;
    a lay down sealing lip extending radially inward and axially toward the oil side from an end of the axial leg and including pumping grooves therein, a distal end of said lay down sealing lip including a bead extending from an outer surface thereof at a location directly radially inward of the axial leg; and
    a dust lip extending from the end of the axial leg in a direction opposite the lay down sealing lip.

2. The seal according to claim 1, wherein when said oil side is under a negative pressure the axial leg flexes inward in response to the negative pressure and engages the bead.

3. The seal according to claim 1, wherein said bead includes an axial venting channel extending therethrough.

4. The seal according to claim 1, wherein when said oil side is under negative pressure, the end of the axial leg flexes to engage the dust lip with the shaft.

5. The seal according to claim 1, wherein said bead includes an axial venting channel extending therethrough.

6. A seal for sealing between a bore and a shaft for separating an oil side from an air side of the seal, comprising:
    a mounting portion;
    a bellows having a first portion extending axially from the mounting portion toward the oil side and radially inward from the mounting portion and a second portion extending radially inward from the first portion and axially toward the air side;
    an axial leg extending axially from the bellows in a second direction opposite to the first direction toward the air side, the axial leg extending from the second portion at a location on a first axial side of the mounting portion, a terminal end of the axial leg is connected to a pivot portion defined by a region of increased thickness relative to a thickness of the bellows, the pivot portion being disposed at a location on a second axial side of the mounting portion opposite from the first axial side, said axial leg including a bead extending from an inner surface thereof;
    a lay down sealing lip extending radially inward and axially toward the oil side from an end of the axial leg and including pumping grooves therein; and
    a dust lip extending from the end of the axial leg in a direction opposite the lay down sealing lip.

7. The seal according to claim 6, wherein when said oil side is under a negative pressure the axial leg flexes inward in response to the negative pressure and the bead engages the lay down sealing lip.

8. The seal according to claim 6, wherein when said oil side is under negative pressure, the end of the axial leg flexes to engage the dust lip with the shaft.

* * * * *